US010008000B2

(12) United States Patent
Wu et al.

(10) Patent No.: US 10,008,000 B2
(45) Date of Patent: Jun. 26, 2018

(54) CAMERA CALIBRATION BASED ON MOVING VEHICLE LINE SEGMENTS

(71) Applicant: Conduent Business Services, LLC, Dallas, TX (US)

(72) Inventors: Hao Wu, Pittsford, NY (US); Robert P. Loce, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 189 days.

(21) Appl. No.: 15/158,336

(22) Filed: May 18, 2016

(65) Prior Publication Data

US 2017/0337699 A1      Nov. 23, 2017

(51) Int. Cl.
  *G06T 7/00* (2017.01)
  *G06T 7/246* (2017.01)
  *G06T 7/33* (2017.01)
(52) U.S. Cl.
  CPC ............... *G06T 7/248* (2017.01); *G06T 7/33* (2017.01); *G06T 2207/30204* (2013.01); *G06T 2207/30252* (2013.01)

(58) Field of Classification Search
  CPC . G06T 7/248; G06T 7/33; G06T 2207/30204; G06T 2207/30252
  See application file for complete search history.

(56) References Cited

U.S. PATENT DOCUMENTS

2010/0321489 A1* 12/2010 Chen ................... G01C 11/02
                                                                  348/116
2015/0178922 A1*  6/2015 Nakai ..................... G06T 7/80
                                                                  348/187

* cited by examiner

*Primary Examiner* — Huy Thanh Nguyen
(74) *Attorney, Agent, or Firm* — MH2 Technology Law Group LLP (57) ABSTRACT

Systems, methods, apparatus, and computer-implemented methods are provided for determining a camera calibration. The method includes accessing video data for a geographic area captured by a video camera. The video data is processed to detect a plurality of moving vehicles in the video data. A detection area is defined based on the plurality of moving vehicles. A plurality of line segments are identified for each of the plurality of vehicles detected in the video data. A plurality of vanishing points are estimated based on at least a subset of the plurality of line segments. A camera calibration is determined based on the plurality of vanishing points.

20 Claims, 8 Drawing Sheets

CAMERA CALIBRATION BASED ON MOVING VEHICLE LINE SEGMENTS

TECHNICAL FIELD

The present disclosure relates generally to methods, systems, and computer-readable media for obtaining vanishing points for camera geometric calibration.

BACKGROUND

Camera geometric calibration, namely the conversion of image pixel coordinates to real-world coordinates, is a critical step for various image-based and video-based transportation applications such as speed enforcement, on-street parking, etc. The most straightforward approach is to temporarily lay out visible markers with known real-world dimensional measurements, manually take an image/video of the scene, manually identify the pixel coordinates of those markers, and then use standard camera calibration techniques to derive appropriate transformations. Such a method may be labor intensive and/or disruptive to traffic flow.

Regardless of how the initial camera calibration is done, over time the accuracy of the calibration may deteriorate due to focal shifts, camera alignment or other factors. Eventually it will no longer be able to perform the required function of converting image pixel coordinates to real-world coordinates with sufficient accuracy.

SUMMARY

The present disclosure relates generally to methods, systems, and computer readable media for providing these and other improvements to determine camera calibration.

According to some embodiments, video data for a geographic area captured by a video camera is accessed. The video data is processed to detect a plurality of moving vehicles in the video data. A detection area is defined based on the plurality of moving vehicles. A plurality of line segments are extracted for each of the plurality of vehicles detected in the video data. A plurality of vanishing points is estimated based on at least a subset of the plurality of line segments. A camera calibration is determined based on the plurality of vanishing points.

According to some embodiments, extracting a plurality of line segments includes detecting a plurality of edges of one of the plurality of vehicles within the detection area; and identifying straight line segments within the detection area using one of a Hough transform and a Line Segment Detector.

According to some embodiments, an orientation is determined for each of the plurality of line segments; and line segments are grouped into one of a plurality of groups based on the orientation of the line segments.

According to some embodiments, the plurality of groups includes a first group and a second group, the line segments in the first group having line segments that are substantially perpendicular to the line segments of the second group.

According to some embodiments, determining a camera calibration includes generating an inverse perspective mapping based on at least two of the vanishing points.

According to some embodiments, the method may be performed in a video camera.

According to some embodiments, the camera calibration is applied to image data captured by the video camera.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

As described herein, systems, methods, apparatus, and computer-readable media, storing instructions to perform methods are described to determine camera calibration.

The method includes accessing video data for a geographic area captured by a video camera. The video data is processed to detect a plurality of moving vehicles in the video data. A detection area is defined based on the plurality of moving vehicles. A plurality of line segments are identified for each of the plurality of vehicles detected in the video data. A plurality of vanishing points are estimated based on at least a subset of the plurality of line segments. A camera calibration is determined based on the plurality of vanishing points.

Figure 1:
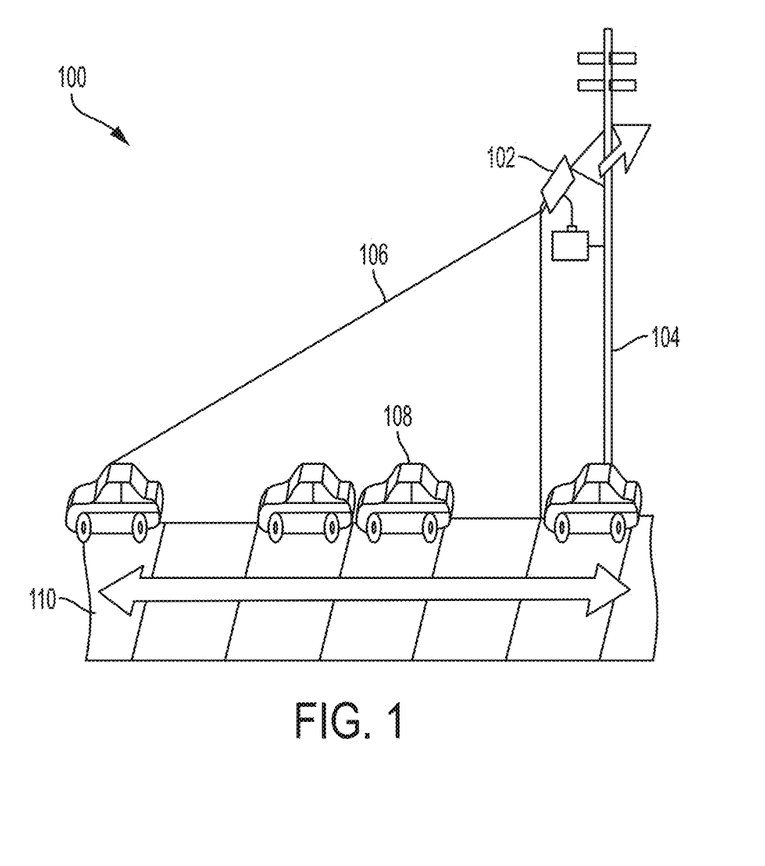
FIG. 1 is an example system environment, consistent with one or more disclosed embodiments.

FIG. 1 depicts an example system environment 100 for implemented features consistent with one or more disclosed embodiments. As shown in FIG. 1, an image capture device, such as, for example, a video camera 102 is depicted mounted on a street post 104. The video camera 102 has a field of view 106 and captures video data of one or more vehicles 108 as the vehicles 108 travel on a road 110.

It may be appreciated that while FIG. 1 depicts video camera mounted on a street post 104, according to one or more embodiments, the video camera may be mounted, or otherwise positioned, anywhere such that it is capable of capturing video data of one or more vehicles, such as a motor vehicle, a street car, a train, or other type of vehicle, moving along a defined path, such as a road, parking garage, tracks, highway, etc.

It may further be appreciated that according to one or more embodiments, the system environment may further include a computing device that is communicably linked, either wired or wireless, directly or indirectly (via a network, local, wide-area, or otherwise), to a computing device that is capable of receiving video data captured by the video camera and performing processing on the image data in order to determine camera calibration as discussed herein.

Figure 2:
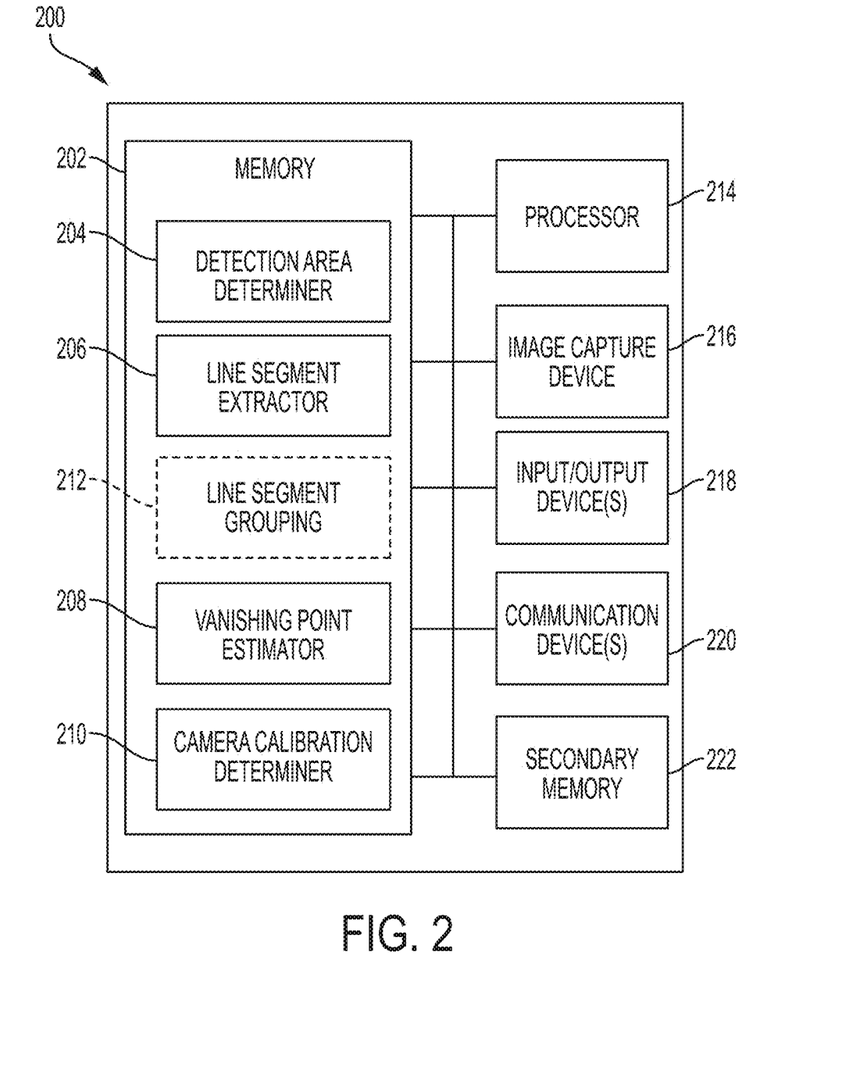
FIG. 2 is a block diagram depicting an example video camera arrangement for determining camera calibration, consistent with certain disclosed embodiments.

FIG. 2 is an example block diagram of the components of a computing device 200 in accordance with some embodiments. According to some embodiments, the computing device 200 may be implemented within video camera 102 depicted in FIG. 1. As shown in FIG. 2, computing device 200 includes memory 202. Memory 202 may include detection area determiner 204. Detection area determiner 204 may access video data from a secondary memory 222 that was captured by the video camera 102. The video data may include a video sequence of one or more vehicles 108 travelling on a road 110. Detection area determiner 204 may process the video data to detect, or segment, the one or more vehicles in the video data, for example, by background subtraction, vehicle detection, or other suitable methods, in order to define a detection area.

Figure 3:
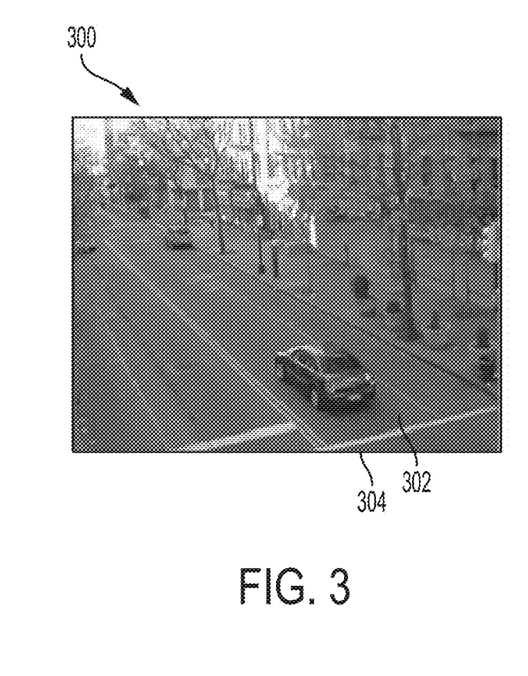
FIG. 3 is an example image from a video sequence of video data.
Figure 4:
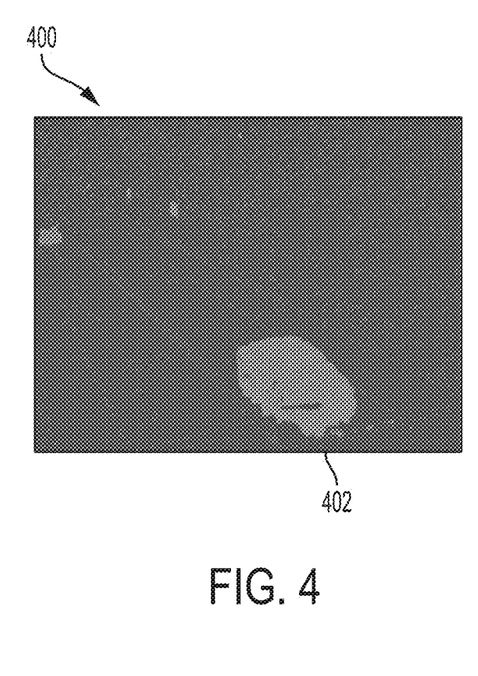
FIG. 4 is an example of a detection area that has been defined in the image of FIG. 3.

For example, FIG. 3 depicts an image 300 of a sequence of images in video data including a vehicle 302 travelling on a road 304. Using a method such as background subtraction, the vehicle 302 may be determined. Alternatively, other vehicle determination methods may be used, for example, methods based on detection using texture features (HOG—Histogram of Oriented Gradients, or LBP—Local Binary Patterns), or color (e.g., color histograms). FIG. 4 depicts an image 400 where the area of the detected vehicle 402 is defined as the detection area for line segment extraction.

Returning to FIG. 2, memory 202 further includes line segment extractor 206. Line segment extractor 206 extracts line segments from the defined detection area determined by detection area determiner 204. According to some embodiments, the line segment extractor may extract line segments by detecting edges in the detected area. A Hough transform may then be applied in order to find straight line segments. Line segments may be extracted by other methods known in the field of computer vision, for example, the LSD (Line Segment Detector) algorithm. It may be appreciated that edge detection may not be required on the full image, but only in the defined detection area.

Figure 5:
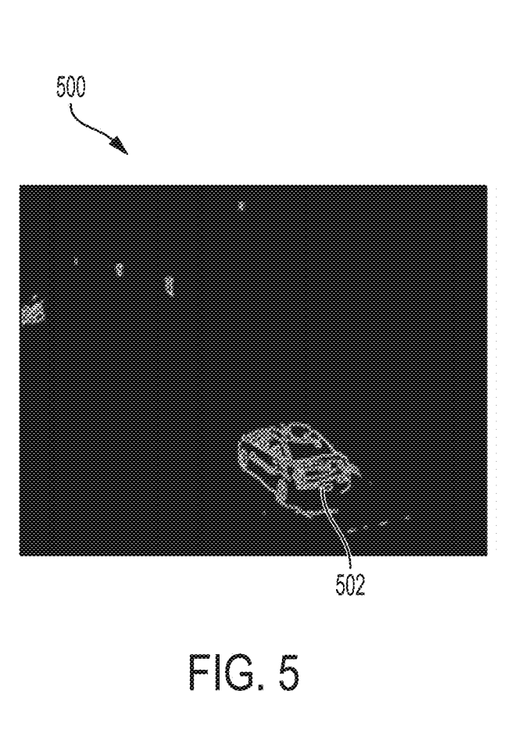
FIG. 5 is an example image depicting an extracted line segment in the image in FIG. 3.
Figure 6:
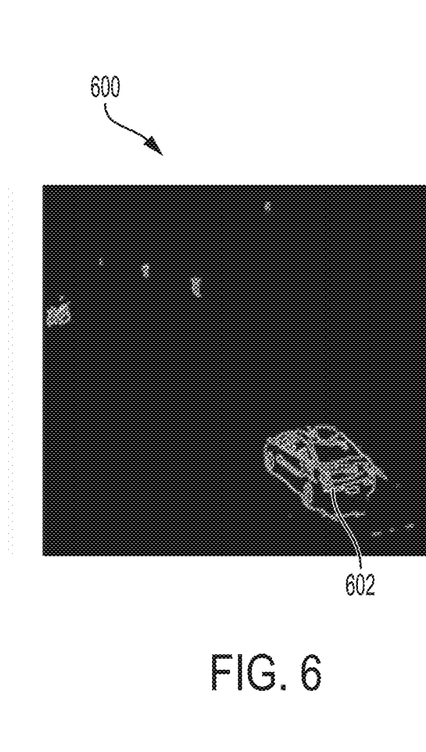
FIG. 6 is an example image of an extracted line segment in the image in FIG. 3.
Figure 7:
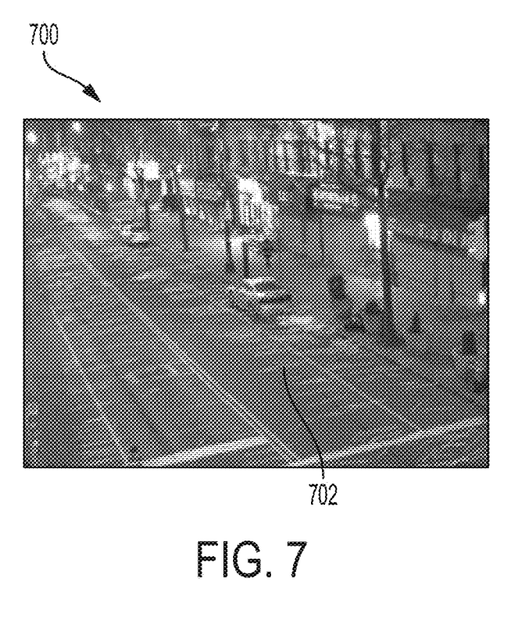
FIG. 7 is an example image of a group of extracted line segments from the image in FIG. 3.

For example, furthering with the example depicted in FIGS. 3 and 4, FIG. 5 depicts an image 500 including the vehicle in the defined detection area where line segment 502 is detected. FIG. 6 depicts an image 600 including the vehicle in the defined detection area where line segment 602 is detected.

Optionally, memory 202 may include line segment grouping 212 for grouping the line segments that were extracted by line segment extractor 206. Line segment grouping 212 may determine orientation of the line segments that were extracted and group line segments having the same orientation into one of a plurality of groups. This may be performed by analyzing how the length and orientation of the line segments progress through the video sequence. One of the groups may have line segments that are generally perpendicular, or perpendicular to line segments grouped in another group. For example, the line segment 502 may be grouped in a "lateral" line segment group, while line segment 602 may be grouped in a "longitudinal" line segment group.

It may be appreciated that according to some embodiments, outlier line segments may be filtered out. By grouping the line segments in this manner, and using the grouped line segments to determine the vanishing points, the vanishing points may be more accurately determined.

For example, a random sample consensus (RANSAC) process may be used in order to filter out the outlier line segments, or other suitable filtering methods may be used.

According to some embodiments, the line segment grouping 212 may be performed by line segment extractor 206 or vanishing point estimator 208.

Returning to FIG. 2, memory 202 may further include vanishing point estimator 208. Vanishing point estimator 208 may estimate multiple vanishing points based on the line segments extracted by the line segment extractor 206 and/or the line segment grouping 212. According to one or more embodiments, the vanishing points may be determined by reducing the noise within the line segment groups via a RANSAC process in order to select those line segments that are representative of the respective group. The vanishing point for each group may be determined as the convergence point of the line segments in the respective groups.

Figure 8:
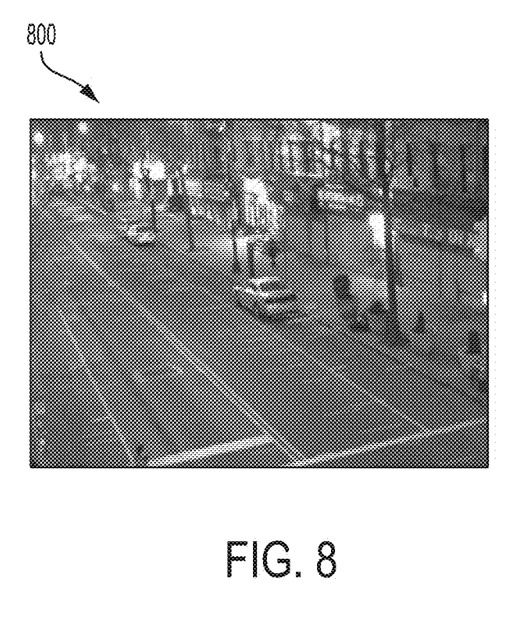
FIG. 8 is an example image of a subset of lines selected by RANSAC that can be used to estimate a vanishing point in the image in FIG. 3.

Furthering the example depicted in FIGS. 3-6, FIG. 7 depicts line segments 702 of one line segment group, the "lateral" group in image 700, from video taken over a period of time, for example two hours. FIG. 8 depicts the image 800 including line segments that have been filtered, for example, after RANSAC processing has occurred. The vanishing point can be found by extending the length of the lines. Their point of intersection will be the vanishing point. The lines in this figure converge to the left. Therefore the vanishing point is to the lower left, quite a way from the frame of the image. Not all lines will converge at the exact point, and thus an average convergence process may be used in order to estimate the convergence point of the filtered line segments. For instance the mean position of all intersections, or a trimmed mean where intersections that are more distant from a mean are not included in the calculation of the trimmed mean.

Figure 9:
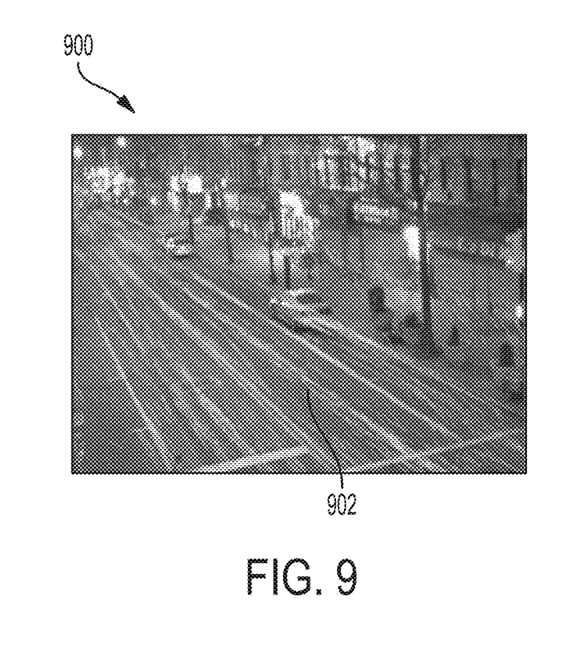
FIG. 9 is an example image of a group of extracted line segments from the image in FIG. 3.
Figure 10:
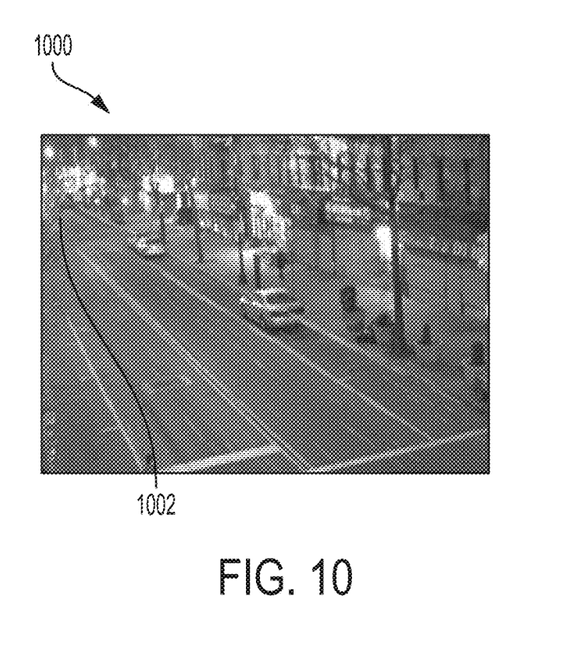
FIG. 10 is an example image of a subset of lines selected by RANSAC that can be used to estimate a vanishing point in the image in FIG. 3.

FIG. 9 depicts line segments 902 of one line segment group in image 900, the "longitudinal" group, from video taken over a period of time, for example two hours. FIG. 10 depicts the image 1000 including line segments that have been filtered, for example, after RANSAC processing has occurred. Similar to the process discussed with the line segments in FIG. 8, the vanishing point can be found by extending the length of the lines. Their point of intersection will be the vanishing point. The lines in this figure converge to the upper left. Therefore the vanishing point is to the upper left, outside the frame of the image. Not all lines will converge at the exact point, and thus an average convergence process may be used in order to estimate the convergence point of the filtered line segments. For instance the mean position of all intersections, or a trimmed mean where intersections that are more distant from a mean are not included in the calculation of the trimmed mean Returning to FIG. 2, memory 202 further includes camera calibration determiner 210. Camera calibration determiner 210 may determine a calibration that is to be applied based on the vanishing points that were estimated by the vanishing point estimator 208. Examples of processes by which the vanishing points are converted to camera calibration is described, for example, in "Camera calibration using two or three vanishing points," R, Orghidan, J. Salvi, M. Gordan, and Bog. Orza, Proceedings of the Federated Conference on Computer Science and Information Systems pp. 123-130, and—"Camera Calibration using Vanishing Points," P. Beardsley and D. Murray, Proceedings of the British Machine Vision Conference, organized by the British Machine Vision Association 22-24 Sep. 1992 Leeds, pp 416-425. For example, using the estimated vanishing points, a perspective distortion of the ground plane may be determined. For example, an inverse perspective map may be generated that maps the video data in order to accommodate for the perspective distortion. This mapping, in the form of a table, matrix, or other manner, may be stored in memory 222 and applied to video data that is captured by the video camera.

Returning to FIG. 2, computing device 200 may further include a processor 214. Processor 214 may be implemented as one or more microprocessors of varying core configurations and clock frequencies. Computing device 200 may further include an image capture device 216 that is configured to capture video data and store the captured video data in secondary memory 202. Computing device 200 may further include input/output device(s) 218 and communication device(s) 220 that are configured to transmit the captured video data, and/or the corrected video data either directly or indirectly to a remote device, such as a server computer. Communication device(s) 220 may be implemented as one or more transmitters for communicating over network protocols using a network interface, such as Ethernet, code divisional multiple access (CDMA), time division multiple access (TDMA), etc.

Computing device 200 may further include one or more memory devices or computer-readable media, for example, memory 202 and secondary memory 222 of varying physical dimensions and storage capacities, such as flash drives, hard drives, random access memory, etc., for storing data, such as images, files, and program instructions for execution by one or more processors 214.

According to some embodiments, one or more processors 214, one or more memory devices or computer-readable media 202 and 222, and communication device(s) 220 may be part of a single device as disclosed in FIG. 2 or may be contained within multiple devices. Those skilled in the art will appreciate that the above-described componentry is exemplary only, as video camera 200 may comprise any type of hardware componentry, including any necessary accompanying firmware or software, for performing the disclosed embodiments.

Figure 11:
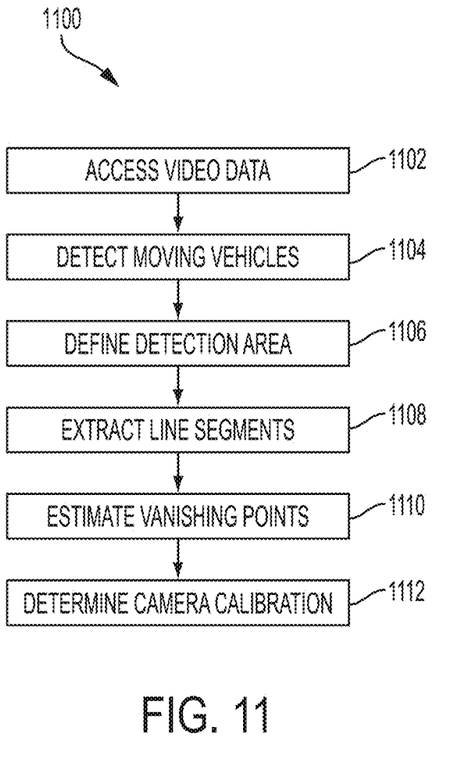
FIG. 11 is a flow diagram of a method for determining camera calibration, according to one or more embodiments.

FIG. 11 is an example flow diagram illustrating a method 1100 of determining camera calibration in accordance with one or more embodiments. It may be appreciated that the method disclosed in FIG. 11 may be performed by the computing device 200 described with regard to FIG. 2, which may be contained within the video camera 102.

As shown in FIG. 11, at block 1102, video data may be accessed for a geographic area captured by a video camera. The video data may be accessed from a memory that stores video data of one or more vehicles travelling on a road over a period of time. At block 1104, the video data is processed to detect a plurality of moving vehicles in the video data. At block 1106, a detection area is defined based on the plurality of moving vehicles. At block 1108, a plurality of line segments are identified for each of the plurality of vehicles detected in the video data. At block 11010, a plurality of vanishing points are estimated based on at least a subset of the plurality of line segments. At block 1112, camera calibration is determined based on the plurality of vanishing points.

According to some embodiments, extracting a plurality of line segments includes detecting a plurality of edges of one of the plurality of vehicles within the detection area; and identifying straight line segments within the detection area using a Hough transform or a Line Segment Detection (LSD) algorithm.

According to some embodiments, the method may further include determining an orientation for each of the plurality of line segments; and grouping line segments into one of a plurality of groups based on the orientation of the line segments.

According to some embodiments, the plurality of groups includes a first group and a second group, the line segments in the first group having line segments that are substantially perpendicular to the line segments of the second group.

According to some embodiments, determining a camera calibration includes generating an inverse perspective mapping based on at least two of the vanishing points.

According to some embodiments, the method may be performed at a video camera that is capturing the video data that is being processed, or at a device that is remote to the video camera that is capturing the video data that is being processed.

According to some embodiments, that method further includes applying the camera calibration to image data captured by the video camera.

Figure 12:
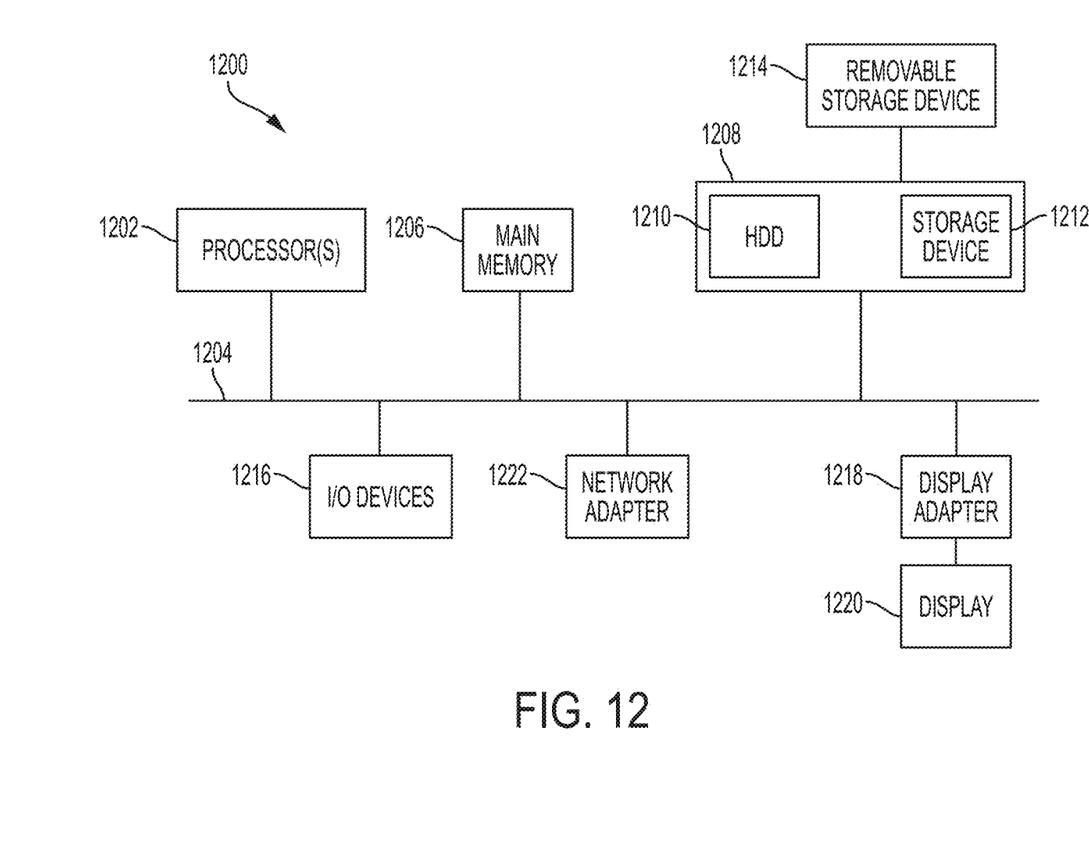
FIG. 12 is a diagram illustrating an exemplary hardware system for determining camera calibration, according to one or more embodiments

FIG. 12 illustrates a block diagram of a computing apparatus 1200, according one or more embodiments. In this respect, the computing apparatus 1200 may be used as a platform for executing one or more of the functions described hereinabove.

The computing apparatus 1200 includes one or more processors 1202. The processor(s) 1202 may be used to execute some or all of the steps described in the methods depicted in FIG. 11. Commands and data from the processor(s) 1202 are communicated over a communication bus 1204. The computing apparatus 1200 also includes a main memory 1206, such as a random access memory (RAM), where the program code for the processor(s) 1202, may be executed during runtime, and a secondary memory 1208. The secondary memory 1208 may includes, for example, one or more hard disk drives 1210 and/or a removable storage drive 1212, representing a portable flash drive, a floppy diskette drive, a magnetic tape drive, a compact disk drive, etc., where a copy of the program code in the form of computer-readable or machine-readable instructions for the detection area determiner 204, line segment extractor 206, line segment grouping 212, vanishing point estimator 208, and camera calibration determiner 210, as discussed with regard to FIG. 2, to execute the method depicted in FIG. 11 may be stored. The storage device(s) as discussed herein may comprise a combination of non-transitory, volatile or nonvolatile memory such as random access memory (RAM) or read only memory (ROM).

The storage drive 1212 may read from and/or writes to a removable storage unit 1214 in a well-known manner. User input and output devices 1216 may include a keyboard, a mouse, a display, etc. A display adaptor 1218 may interface with the communication bus 1204 and the display 1220 and may receive display data from the processor(s) 1202 and convert the display data into display commands for the display 1220. In addition, the processor(s) 1202 may communicate over a network, for instance, the Internet, LAN, etc., through a network adaptor 1222.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art may appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other examples may be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

What is claimed is:

1. A computer-implemented method, comprising:
   accessing video data for a geographic area captured by a video camera;
   processing the video data to detect a plurality of moving vehicles in the video data;
   defining a detection area based on the plurality of moving vehicles;
   extracting a plurality of line segments for each of the plurality of vehicles detected in the video data;
   estimating a plurality of vanishing points based on at least a subset of the plurality of line segments; and
   determining a camera calibration based on the plurality of vanishing points,
   wherein extracting a plurality of line segments includes:
      detecting a plurality of edges of one of the plurality of vehicles within the detection area; and
      identifying straight line segments within the detection area.

2. The computer-implemented method of claim 1, wherein
   identifying the straight line segments comprises identifying the straight line segments using one of a Hough transform and a Line Segment Detector.

3. The computer-implemented method of claim 1, further comprising
   determining an orientation for each of the plurality of line segments; and
   grouping line segments into one of a plurality of groups based on the orientation of the line segments.

4. The computer-implemented method of claim 3, wherein the plurality of groups includes a first group and a second group, the line segments in the first group having line segments that are substantially perpendicular to the line segments of the second group.

5. The computer-implemented method of claim 1, wherein determining a camera calibration includes:
   generating an inverse perspective mapping based on at least two of the vanishing points.

6. The computer-implemented method of claim 1, wherein the method is performed in the video camera.

7. The computer-implemented method of claim 1, further comprising:
   applying the camera calibration to image data captured by the video camera.

8. An apparatus, comprising:
   a memory storing a set of instructions; and
   a processor, configured to execute the stored set of instructions to perform operations comprising:
      accessing video data for a geographic area captured by a video camera;
      processing the video data to detect a plurality of moving vehicles in the video data;
      defining a detection area based on the plurality of moving vehicles;
      extracting a plurality of line segments for each of the plurality of vehicles detected in the video data;
      estimating a plurality of vanishing points based on at least a subset of the plurality of line segments; and
      determining a camera calibration based on the plurality of vanishing points,
   wherein extracting a plurality of line segments includes:
      detecting a plurality of edges of one of the plurality of vehicles within the detection area; and
      identifying straight line segments within the detection area.

9. The apparatus of claim 8, wherein
   identifying the straight line segments comprises identifying the straight line segments using one of a Hough transform and a Line Segment Detector.

10. The apparatus of claim 8, the method further comprising
    determining an orientation for each of the plurality of line segments; and
    grouping line segments into one of a plurality of groups based on the orientation of the line segments.

11. The apparatus of claim 10, wherein the plurality of groups includes a first group and a second group, the line segments in the first group having line segments that are perpendicular to the line segments of the second group.

12. The apparatus of claim 8, wherein determining a camera calibration includes:
    generating an inverse perspective mapping based on at least two of the vanishing points.

13. The apparatus of claim 8, wherein the method is performed in the video camera.

14. The apparatus of claim 8, the method further comprising:
    applying the camera calibration to image data captured by the video camera.

15. A non-transitory computer-readable medium storing a set of instructions, executable by a processor to perform operations comprising:

accessing video data for a geographic area captured by a video camera;

processing the video data to detect a plurality of moving vehicles in the video data;

defining a detection area based on the plurality of moving vehicles;

extracting a plurality of line segments for each of the plurality of vehicles detected in the video data;

estimating a plurality of vanishing points based on at least a subset of the plurality of line segments; and determining a camera calibration based on the plurality of vanishing points, wherein extracting a plurality of line segments includes:

detecting a plurality of edges of one of the plurality of vehicles within the detection area; and identifying straight line segments within the detection area.

16. The computer-readable medium of claim 15, wherein identifying the straight line segments comprises identifying the straight line segments using one of a Hough transform and a Line Segment Detector.

17. The computer-readable medium of claim 15, the method further comprising determining an orientation for each of the plurality of line segments; and grouping line segments into one of a plurality of groups based on the orientation of the line segments.

18. The computer-readable medium of claim 17, wherein the plurality of groups includes a first group and a second group, the line segments in the first group having line segments that are perpendicular to the line segments of the second group.

19. The computer-readable medium of claim 15, wherein determining a camera calibration includes:

generating an inverse perspective mapping based on at least two of the vanishing points.

20. The computer-readable medium of claim 15, the method further comprising:

applying the camera calibration to image data captured by the video camera.

* * * * *